United States Patent [19]

Fleming

[11] Patent Number: 4,974,812
[45] Date of Patent: Dec. 4, 1990

[54] QUICK OPENING SOLENOID ACTUATED VALVE

[75] Inventor: William T. Fleming, Raleigh, N.C.

[73] Assignee: Walter Kidde Aerospace, Inc., Wilson, N.C.

[21] Appl. No.: 359,784

[22] Filed: May 31, 1989

[51] Int. Cl.$^5$ ............................................. F16K 31/44
[52] U.S. Cl. ...................................... 251/68; 251/74; 137/522
[58] Field of Search ...................... 251/67, 68, 74, 82; 137/522, 523

[56] References Cited

U.S. PATENT DOCUMENTS

| | | | |
|---|---|---|---|
| 3,095,901 | 7/1963 | Larson et al. | 137/522 |
| 3,134,271 | 5/1964 | Ray | 251/68 |
| 4,289,039 | 9/1981 | Trunner et al. | 251/68 |
| 4,523,602 | 6/1985 | Snyder | 251/74 |

Primary Examiner—A. Michael Chambers
Attorney, Agent, or Firm—Darby & Darby

[57] ABSTRACT

A valve for controlling release of a pressurized fluid comprising a housing having a fluid chamber with an inlet and an outlet port. A piston within the housing is slidably movable between a sealed closed position and an open position. A collapsed support structure, when in a rigid condition retains the piston in the closed position. When the support means is in a collapsed condition, fluid pressure will cause the piston to slide to the open position of the valve. This support structure includes a pair of elongated supports oriented in one of a dead-center locked condition when the piston is sealed, and in an off-center collapsed condition allowing the piston to move to its open position.

20 Claims, 5 Drawing Sheets

QUICK OPENING SOLENOID ACTUATED VALVE

FIELD OF THE INVENTION

The present invention relates generally to fluid valves of the type that have quick response times, and more specifically, to an improved quick response valve for use in a fire extinguishing system.

BACKGROUND OF THE INVENTION

There are many fluid valves available for use with fire extinguishing systems which provide quick response times between a closed and secure position to an open position. U.S. Pat. Nos.: 4,579,315, 3,196,953, and 3,187,499 show examples of such valves. These valves have several limitations which restrict their use to a particular application. One particular valve application with very stringent environmental requirements is in connection with an on-board fire extinguishing system for use within a military tank vehicle. As further discussed below, the prior valves are unable to withstand the relatively harsh environment commonly found within a tank vehicle and would likely malfunction and/or trigger falsely.

All of the above-mentioned patents disclose valve assemblies which include a tripping means for activating the valve and the connected extinguishing system. The tripping means generally consists of a pivotal member or arm that is movable against the action of a spring or the pressure of the system extinguishant. The arm is usually connected directly or indirectly to a seal which keeps the extinguishant within the system until needed (i.e., valve in a closed position). The valve is retained in the closed position using a biasing spring or a retaining clip as in the case of U.S. Pat. No. 3,924,687.

A problem with the retaining means of the prior valves is that they cause the entire valve to become susceptible to false triggering due to relatively harsh environmental conditions such as excessive vibration or sudden movement. Such vibration or sudden movement is quite common in a military tank environment. If any of the prior valves were installed in a fire extinguishing system of a military tank, the system would invariably trigger accidentally owing to tank vibration caused by its engine or its travel over rough terrain, for example, or any sudden movement such as a projectile impact (incoming) or the tank running into a stationary object such as a tree or rock or the sudden weight-shifting movement caused by the firing of a projectile (outgoing). Since the extinguishant currently used in military vehicles is generally in the form of a pressurized gas such as Halon 1301 and stored in a finite amount on the vehicle, any accidental triggering of the system could cause harm to both the vehicle and its surprised operators in time of battle. Accidental misfiring of the system would leave a vehicle, remote in the field, without system protection against any future (actual) fires.

The retaining clip disclosed in U.S. Pat. No. 3,924,687, furthermore is meant to melt away when the temperature of the immediate environment reaches a prescribed temperature. It is common, in the above military tank vehicle application, to have several separate compartments, each capable of reaching different maximum temperatures during operation. Examples of such compartments might include an engine compartment, a living compartment, an ammunition compartment, and perhaps a fuel compartment. In a military tank having a extinguishing system with release valves like that disclosed by U.S. Pat. No. 3,924,687, an engine compartment sensor could mistake a relatively harmless overheating engine as a compartment fire and therefore trigger the system, wasting valuable extinguishant. The same system could also misfire in a situation where the heat sensitive clip of U.S. Pat. No. 3,924,687 softens and extreme vibration, as discussed above, causes the weakened clip to break, thereby opening the valve.

Another problem associated with the prior valves available for fire extinguishing systems operating in such harsh environments is that commonly the outlet nozzles and triggering mechanisms are inaccessible and therefore difficult to reset after a system triggering. It is necessary to close all the nozzles prior to recharging the system with Halon extinguishant, for example. The nozzles are located in the different compartments of a military vehicle and are inaccessible will extend the time required to refill and reset the triggered system.

Another problem associated with fire extinguishing valves using a gaseous system extinguishant such as Halon 1301 is that the seals within the valves are unable to maintain system pressure. The seals can leak over a period of time, creating a useless or less effective extinguishing system when activated. Another problem with the prior fire extinguishing systems is that there is no provision to activate any particular outlet nozzle from a location remote to the nozzle itself through a quick and easy means such as an electrical switch. Also, the prior nozzles fail to provide a back-up trigger for manually activating any particular nozzle at the location of the nozzle.

OBJECTS OF THE INVENTION

In view of the limitations of the prior extinguishing systems, it is an object of the present invention to provide a valve for use with a pressurized system of fluid which is capable of operating in harsh environmental conditions including extreme temperature, vibration, sudden movement, etc., while maintaining an effective seal to the system over long periods of time (while in a closed position).

Another object of the present invention is to provide such a valve that can be either electrically activated from a remote location and manually activated locally.

Yet another object of the present invention is to provide such a valve that can be easily reset to the closed position.

Still another object of the present invention is to provide such a valve that can withstand the elements of a harsh environment while holding back high system pressures and that can be opened using a relatively weak force.

Another object of the present invention is to provide a valve for a pressurized system having a sealing surface whose sealing effectiveness is relative to the magnitude of pressure in the system.

SUMMARY OF THE PRESENT INVENTION

The present valve is intended for use in a fluid system for controlling the release of a pressurized fluid. The valve comprises a housing having a fluid chamber, an inlet port and an outlet port which are in fluid communication with the fluid chamber, the inlet port includes a sealing surface. The present valve also includes a piston which is slidably positioned within the housing. The piston includes a valve surface and is movable along an axis between a closed position where the valve surface lies within the inlet port and an open position where the valve surface lies remote to the inlet port. The present valve further includes means for sealing the piston within the inlet port with a radially directed sealing force when the piston is in said closed position. The sealing means engages the sealing surface of said inlet port. The sealing force is generated by the force exerted on the valve surface of the piston by the adjacent pressurized fluid. The sealing force is sufficient to prevent fluid communication of the pressurized fluid with the fluid chamber when the piston is in the closed position. The present valve further includes means for providing selective support for controlling the position of the piston relative to the inlet port. The support means is changeable between a rigid condition and a collapsed condition. The piston movement between the closed and open positions is responsive to the condition of the support means, wherein the support means during the rigid condition retains the piston in the closed position against the action of the opposing force of the pressurized fluid exerted on the valve surface and the support means during the collapsed condition is unable to retain the piston in the closed position against the pressurized fluid. During the collapsed condition, the pressure of the fluid causes the piston to move from the closed position to the open position, thus providing fluid communication between the inlet and the fluid chamber. Finally, means is provided with the present valve for controlling the condition of the support means.

DETAILED DESCRIPTION OF THE PREFERRED EMBODIMENT

Figure 1:
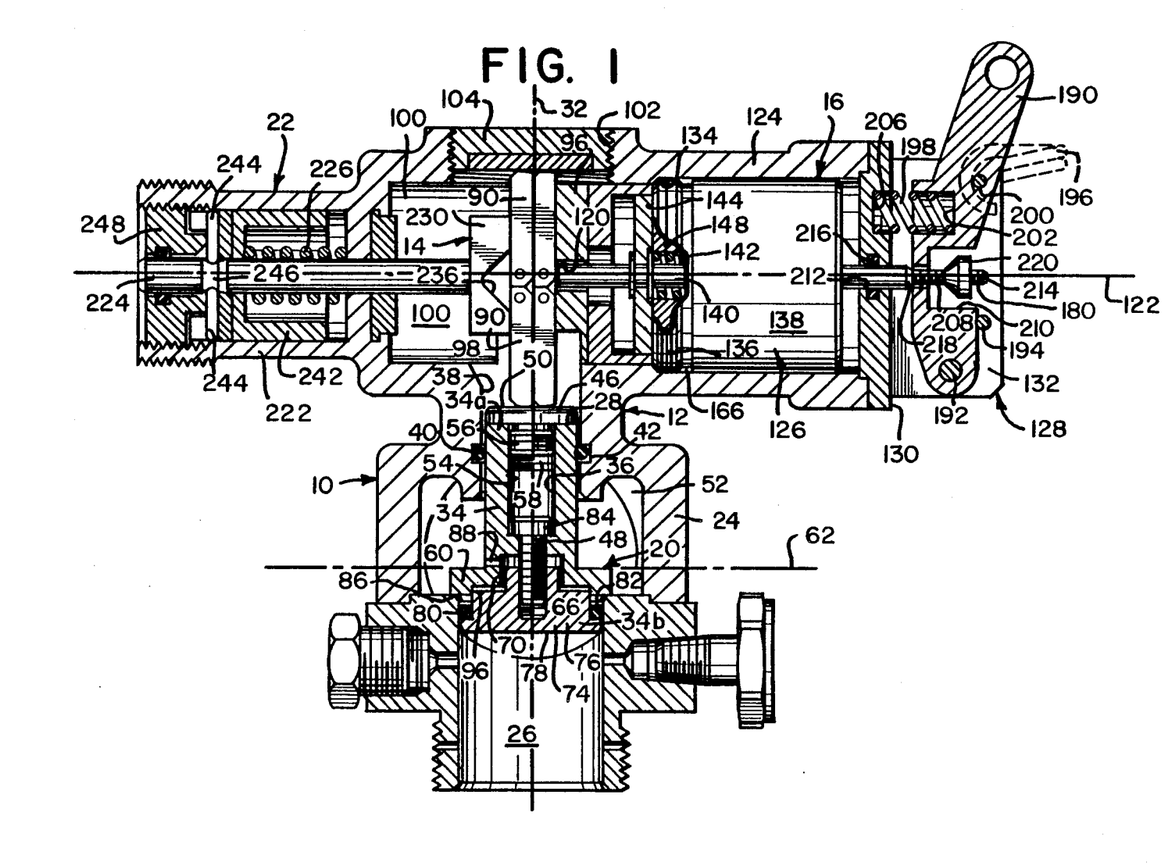
FIG. 1 is a sectional side view of the present valve in a closed position.

Referring to FIG. 1, a valve 10 of the present invention is shown in a closed and locked position. For discussion, the valve 10 can be sectioned into six different components. A main housing 12 which houses a locking assembly 14, a triggering assembly 16, a sealing component 18, a valve component 20, and a resetting assembly 22.

The main housing 12 is preferably made from any strong metal such as aluminum or steel. It is preferred that the housing be cast to reduce the time and cost of manufacture. The material used for the main housing must withstand more than the magnitude of the highest pressure reached in the system.

The valve component 20 of the present valve 10 includes a fluid housing 24 which has an inlet port 26 and an outlet port 30. The fluid housing 24 is attached to the main housing 12, preferably by mating screw threads formed on a portion of the main housing 12 and the fluid housing 24.

A piston 34, which includes the sealing component 18 at its lower end 34b as described further below, is positioned within a cylinder 38 located in the main housing 12. The piston 34 is slidable from a closed position to an open position following a piston axis 32. The piston 34 is preferably made from a strong lightweight material such as aluminum. The lighter the piston 34, the faster the valve will be able to open. It is also preferred that the piston 34 be hollow, forming an internal piston cavity 36 and defining a rim surface 28. As later described, the internal piston cavity 36 provides a movable securing point for securing the sealing component 18 to the lower end of the piston 34. The piston cavity 36 extends from an upper edge of the piston 34 to a stop flange 60 located adjacent the lower end 34b of the piston 34. The stop flange 60 is used to secure the sealing component to the piston, as described below. The stop flange 60 defines a central opening 48 that has an inner diameter whose magnitude is less than that of the cavity 36.

The cylinder 38 preferably is formed with the casting of the main housing 12. A seal 40 is provided between the piston 34 and the wall of the cylinder 38. The seal 40 located within a groove 42 formed circumferentially along the wall of the cylinder 38. It is preferred that the seal 40 be an O-ring seal and that the groove 42 is located at such a point within the cylinder 38 that the piston 34 will remain in sealing contact with the O-ring seal 40 during its travel between the open and closed positions. The seal 40 prevents any fluid within the fluid system from entering the locking assembly 14 after the valve has been opened and also prevents contaminants lying outside the valve from entering. Moisture, dirt, and oxygen can cause damage to the valve's operation if the inner components of the valve are exposed to such contaminants for long periods of time. The integrity of the inner components of the valve against such contaminants depends on the material from which they are made. For example, if steel is chosen for the material of the piston 34, moisture present within the valve component could damage the smooth operation of the piston by introducing a layer of rust on the piston's surface.

The sealing component 18, is adapted to selectively seal-off the inlet port 26, thereby closing the valve 10. The sealing component is supported by the piston 34 and is movable with the piston between the closed position where the inlet port 26 is sealed and the open position where fluid communication is provided between the inlet port 26 and the outlet port 30.

Figure 3:
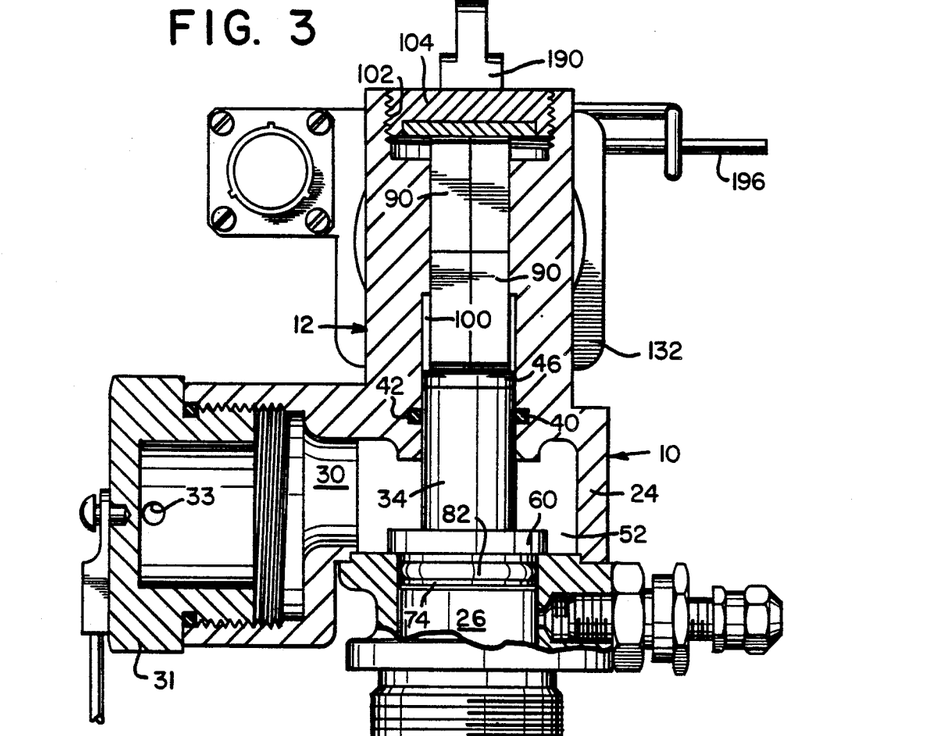
FIG. 3 is a sectional front view of the present valve in the closed position.

FIG. 3 shows the outlet port 30 plugged with a protective cap assembly 31. The protective cap assembly 31 is secured to the outlet 30 of valve 10 during the valve's initial installation into a vehicle (such as a military tank). In a typical application, the valve assembly 10 will be secured to the top portion of a supply tank (not shown) of Halon (or any other gaseous extinguishant). The protective cap 31 is screwed into the outlet port and includes radially disposed openings 33. In the event the valve assembly 10 opens prior to installation to an onboard extinguishing system, any release of extinguishant will be released in a controlled and safe manner by dissipating the relatively high supply tank pressure through the small openings 33.

A fluid chamber 52 connects the inlet port 26 with the outlet port 30. The chamber 52 is generally spherical in shape and formed with the casting of the fluid housing 24. The piston 34 travels within the fluid chamber 52 between the open and closed positions. As shown in FIG. 1, a portion of the piston 34 is always located in the cylinder 38.

The piston 34 is adapted to support the sealing component 18 such that the valve 10 can withstand high gaseous pressures at the inlet port 26. An upper portion 34a of the piston 34 opposite the sealing component 18 supports a plug 46 having a contact surface 50. The plug 46 and contact surface 50 are preferably made from a strong durable material according to the frequency of valve operation and amount of system pressure measured at the inlet port 26. The purpose of the plug 46 and the contact surface 50 is to provide mechanical communication between a portion of the locking assembly 14 and the piston 34. The plug 36 is adapted to be secured in an opening 54 of the upper piston 34a. The plug 46 can be secured in any conventional fashion, however, it is preferred that the plug 46 be easily removable to permit access to the interior of the hollow piston 34. A strong, lightweight material such as aluminum is a preferred material for the plug 46. The plug 46 include screw threads 56 along its cylindrical surface which are adapted to engage screw threads 58 located along the wall of the internal cavity 36, adjacent the rim surface 28. The plug 46 includes a flange which extends over the rim surface 28 and provides support for the plug 46.

The lower portion 34b of the piston 34 includes a support flange 60. The support flange 60 extends around the lower portion 34b of the piston 34, lying in a plane 62 which is perpendicular to the piston axis 32. The support flange 60 includes a circumferential sealing flange 64 adjacent to its periphery. The sealing flange 64 extends downward from the support flange 60, parallel to the piston axis 32. The sealing flange 64 creates a flat edge surface 86 which is parallel to the support flange plane 62. The support flange 60 and the sealing flange 64 are preferably form an integral part with the piston 34. The support flange 60 lies just below the location of the stop flange 60 and defines a support flange recess 68. The support flange 60 has an outer diameter which is greater than the inner diameter of the inlet port 26. The sealing flange 64 forms a cylindrical section having an outer diameter which is substantially equal to the inner diameter of the inlet port 26. The cylindrical sealing flange 64 defines a sealing flange recess 70. The recess 70 includes an inner wall 96. The support flange 60 and the sealing flange 64 are positioned such that as the piston 34 descends to a closed valve position, the sealing flange 64 will move into the inlet port 26 before the entire piston assembly is stopped by the contact of the larger diameter support flange 60 with the upper edge of the smaller diameter inlet port 26, as shown in FIG. 1.

A sealing piston 74 is positioned within the lower piston 34b. The sealing piston 74 has an upper portion located within the sealing flange recess 70 and the support flange recess 68. The sealing piston 74 is shaped similar to that of the combined recesses 52, 50. A wall of the sealing piston 74 is in sliding engagement with the inner wall 96 of the sealing flange 64, slidable along the piston axis 32. The inner wall 96 acts like a cylinder to the sealing piston 74. A sealing lip 76 is positioned along the periphery of the lower portion of the sealing piston 74, lying in a plane 78 which is perpendicular to the piston axis 32. The sealing lip 76 is an integral part of the piston 74. The outer diameter of the sealing lip 76 is substantially equal to the inner diameter of the inlet port 26. The sealing lip 76 includes a contact surface 80 which is directed upward in FIG. 1. A space is defined between the contact surface 80 and the flat edge surface 86. A circular O-ring seal 82 is located within this space. The seal 82 is positioned around the sealing piston wall and is supported by the upwardly directed contact surface 80. The diameter of the O-ring seal 82 is preferably equal in magnitude to the radial width of the flat edge surface 86. The sealing piston 74 and the sealing flange 64 are positioned such that as the sealing piston 74 slides within the sealing flange recess 70 the sealing lip 76 moves the contact surface 80 upward against the flat edge surface 86, thereby decreasing the defined space, and the O-ring seal 82 positioned therein. A bolt 84 is provided for attaching the sealing piston 74 to the piston 34. The bolt 84 is threaded into the top of the sealing piston 74, as shown in FIG. 1. The shaft of the bolt is generally equal in diameter to the inner diameter of the opening 48 defined by the stop flange 60. The opening 48 receives the shaft of the bolt 84. The head of the bolt has a diameter which is smaller than the inner diameter of the cavity 36 and greater than the inner diameter of the opening 48. The piston cavity 36 houses the head of the bolt 84. The bolt 84 can move along the central piston axis 32 between a point where its head makes contact with the upper surface of the stop flange 60 and a point where the contact surface 80 contacts the flat edge surface 86.

A lower surface 86 of the sealing piston 74 is exposed to system pressure, being in contact with the fluid used in the system. The pressurized fluid located at the inlet port 26 pushes against the lower surface 86. The ratio of the area of the lower surface 86 of the piston to the projected annular area of the O-ring seal 82. The greater the ratio is, the greater the amplifying sealing effect the sealing assembly provides. The upwardly directed force provided by the system pressure against the lower surface 86 moves the sealing piston 74 towards the piston 34. As the sealing piston 74 moves upward, the contact surface 80 and the flat edge surface 86 move toward each other, thereby compressing the O-ring seal 82. In response to this compression, the O-ring expands radially within a plane which is perpendicular to the piston axis 32. The expanding seal 82 contacts the outer wall surface of the sealing piston 74 and establishes a sealing engagement with the inner wall surface of the inlet port 26. The greater the system pressure, the greater the compression force exerted on the O-ring seal and the tighter the seal formed between the sealing piston 74 and the inner sealing surface of the inlet port 26. A passage 88 is located within the piston 34 to provide fluid communication between the combined recesses 68, 70 and the fluid chamber 52. As the sealing piston 74 moves along the piston axis 32, any pressure or vacuum developing within the hollow piston cavity 36 or the combined recesses 68, 70 will equilibrate via the passage 88. Otherwise, the effectiveness of the sealing piston can be hindered.

When the valve opens, the system pressure moves the entire piston 34 upward into the fluid chamber 52, opening fluid communication to the outlet port 30.

The O-ring seal 82 is protected within the defined space above the sealing lip 76. When the valve 10 opens, the tremendous flow of high pressure system fluid rushes past the lower surface 86 of the piston 34. The sealing lip 76 protects the expanding seal 82 from being displaced or otherwise damaged by the rush of the system fluid. This allows for the preferred use of a relatively soft O-ring material for the expanding seal 82 that will readily conform to any surface defects and still remain in tact after the piston is "blown" out of the sealing bore during the opening procedure.

Figure 2:
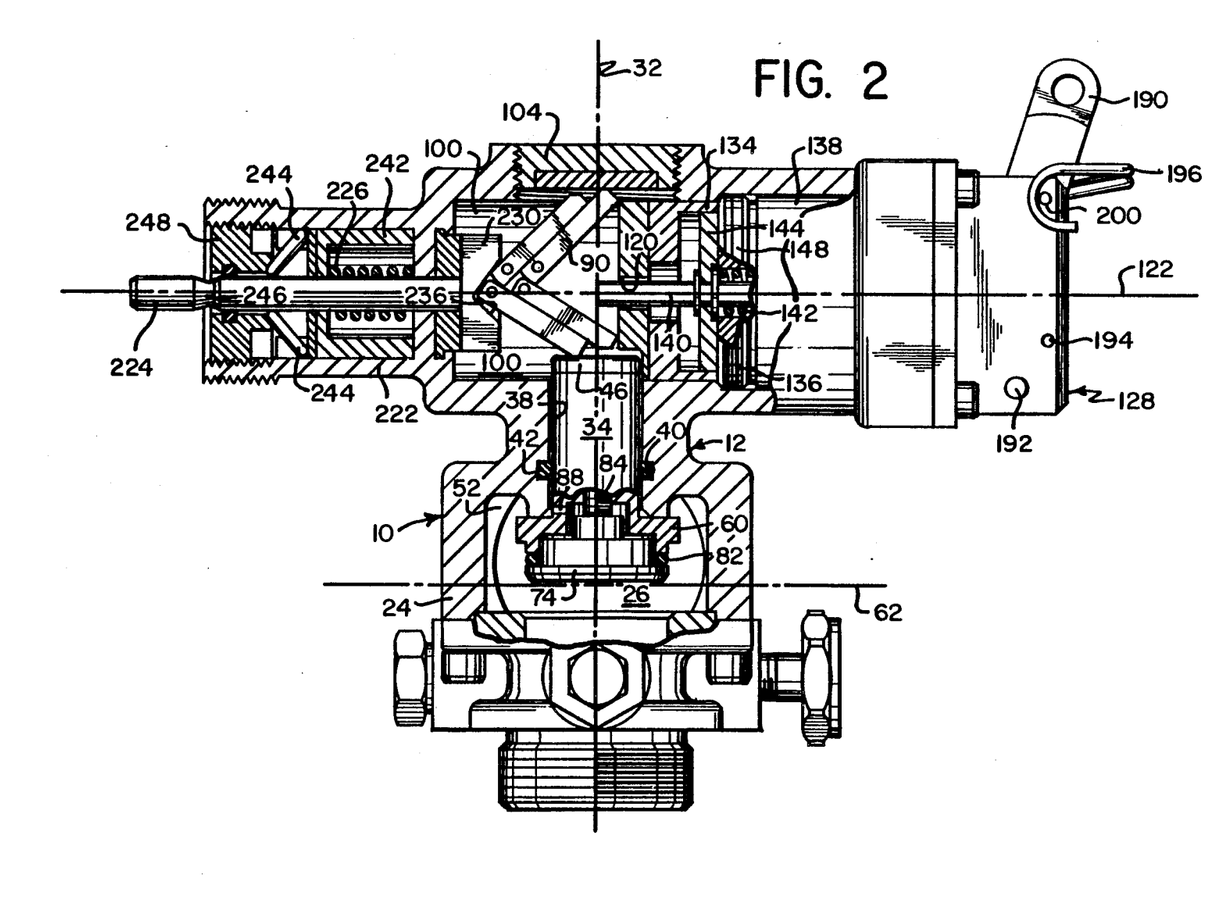
FIG. 2 is a sectional side view of the present valve in an open position.

The locking assembly 14 is positioned in the main housing 12 above the piston assembly 28, as shown in FIGS. 1 and 2. The locking assembly includes two sets of column supports 90, a support wall 96, a column chamber 100 and an access port 102, sealed by an access plug 104.

Figures 4A, 4B:
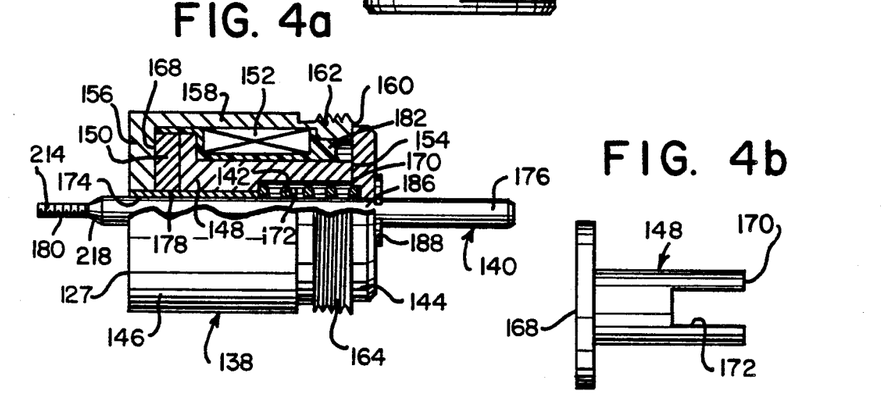
FIG. 4a is a partially sectional view of the solenoid assembly of the present valve.
FIG. 4b is a plan view of an inner core of the solenoid assembly of the present valve.
Figures 4C, 5A, 5B, 5C, 5D, 6A, 6B, 6C:
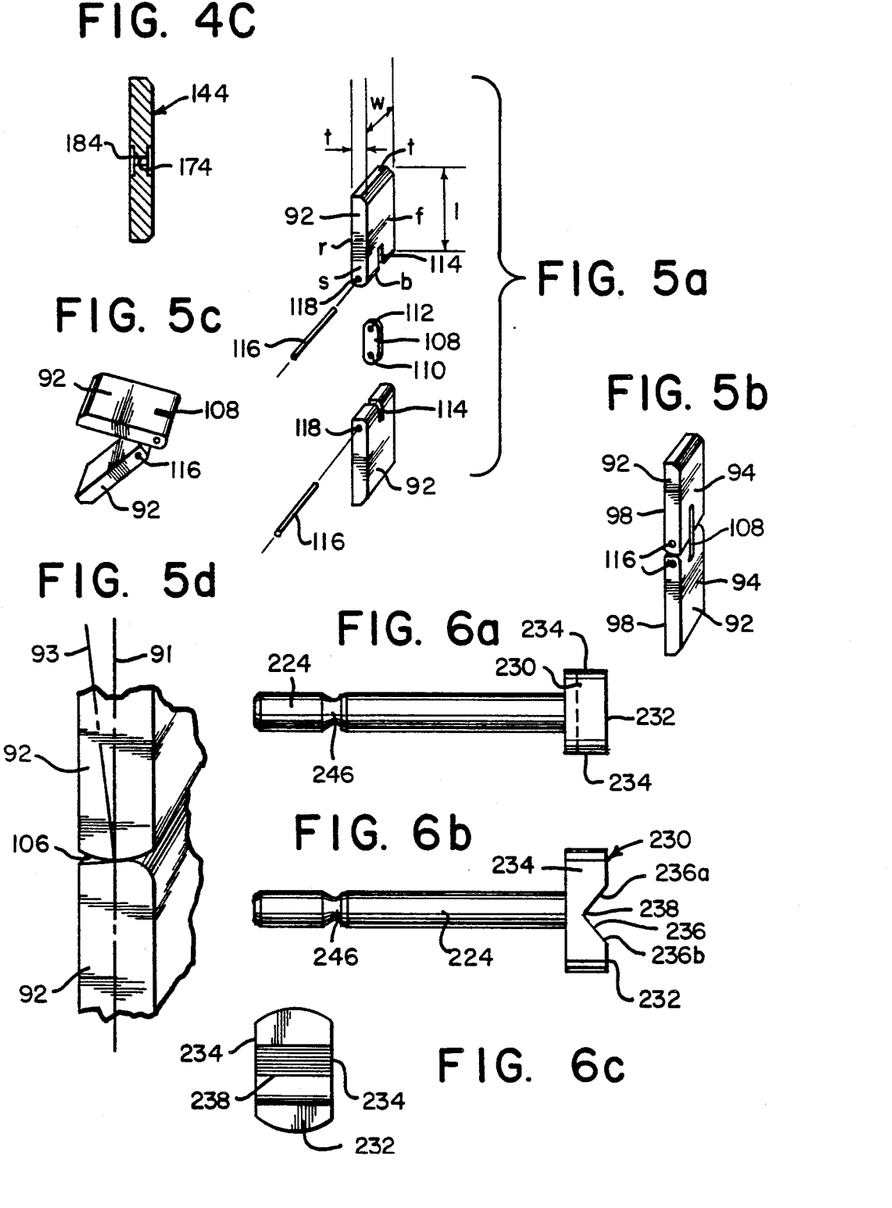
FIG. 4c is a sectional side view of an armature of the solenoid assembly of the present valve.
FIG. 5a is an exploded isometric view of a column support of the present valve.
FIG. 5b is an isometric view of the column support in an upright and supportive position.
FIG. 5c is an isometric view of the column support in a collapsed position.
FIG. 5d is an enlarged view of the contacts point between two adjacent support segments.
FIGS. 6a-6c are plan views of a reset plunger.

Each set of column supports 90 consists of two segments 92, as illustrated in FIGS. 5a–5d. Each segment 92 is preferably made from a strong metal having a hardened surface, such as tool steel, surfaced hardened. Each segment 92 is preferably rectangular in shape, consisting of a length l, a width w, and a thickness t, a front face f, a rear face r, a top face t, a bottom face b and two side faces s. The top and bottom faces of each segment 92 are curved following around an axis which is parallel to the width dimension of the segment 92. The degree of arc is dependent on several design consideration including the system pressure, the length of the support columns 90, the magnitude any undesirable external tripping forces, and the magnitude of the stabilizing force provided by the resetting assembly, described below. The curvature of the arc preferably provides a stable vertical arrangement of column supports, but creates instability when the two segments begin to collapse (FIG. 5c shows the collapsed position). FIG. 5d shows a vertical axis 91 and an instability axis 93. When one segment 92 is moved about a connecting cross-link (described below) past the instability axis 93, the two segments 92 will proceed to the collapsed position.

The column support 90 travels from a stable position, as shown in FIG. 5b to an unstable position (to axis 93 in FIG. 5d) by moving a finite distance under "rolling friction" loads only. This condition is produced by constructing the column segments 92 from a roller or cylindrical bearing whose rolling surfaces are formed by an arc radius preferably equal to approximately one half the length of the column segment 92. There are preferably no flat surfaces on the rolling surfaces of the column segments 92. Each column support 92 includes either a top face having a rolling surface or a bottom face having a rolling surface. The connected column segments 92 are arranged so that their rolling surfaces contact each other. The contacting rolling surfaces provide sufficient contact support to withstand high system pressures and still provide means to buckle or collapse the column supports 90 when desired. The column supports 90 become unstable only after sufficient "knuckling" occurs to cause the rolling surface to be out of contact with the load path (vertical). The unstable position is represented in FIG. 5d by axis 93.

The column supports 90, because of the ability to move to their unstable position by "rolling friction" require less of a transversely directed tripping force to make unstable than an equivalent pin-hinged support design (two adjacent segments connected only by a hinge pin with no contacting faces).

In one embodiment, the edge lying parallel and adjacent to the rolling surface of each segment 92 is rounded. This rounded edge 106, as shown in FIG. 5d. These rounded edges 106 help collapse the assembled segments 92, as later described.

The segments 92 are arranged in vertical pairs to form the column supports 90, as shown in FIGS. 1 and 5b, with the bottom face of two segments 92 contacting the top faces of the others, respectively. The rounded edges 106 are arranged symmetrically within each column support 90, the rounded edge along a bottom face of one segment 92 of one column support 90 aligning with the rounded edge along a top face of the other segment 92 of the same column. Each column support 90, arranged in a straight position, as shown in FIGS. 1 and 5b includes a front surface 94 and a rear surface 98 (combining the individual segment 92 faces). One front surface 94 of one column support 90 is abutted against one rear surface 98 of the other column support 90. The interface of the two abutting column supports 90 lies along the vertical piston axis 32. The two segments 92 forming each column support 90 are connected across the respective top and bottom faces with a cross link 108. The cross link 108 is a linear piece of plate steel having an opening 110 of one diameter located adjacent one end and another opening 112 having a larger diameter, located at the other end. The cross link 108 is adapted to fit into slots 114 formed into each segment 92. One slot 114 is formed approximately midway along the width dimension of each segment 92, within a plane which is parallel to either side surface. The slot 114 is only made through the connecting faces, the top and bottom face of each respective segment 92 forming a column support 90. A pin 116 is used to connect the cross link to the segments 92 of each column support 90. Openings 118 are provided adjacent the respective top and bottom faces of the segments 92 of each column support 90. The openings 118 are extend from one side face to the other and are adapted to tightly receive the locking pin 116. The respective openings 118 are arranged so that they intersect the respective slots 114, aligning with the respective openings 82, 84 of each end of the cross link 108. The locking pin 116 is positioned into each respective opening 118 and intersecting openings 82, 84, thus engaging one respective end of the cross link 108. The end adjacent the opening 110 having a smaller diameter includes squared off corners which seat into one respective slot 114 so that it cannot pivot about its engaged locking pin 116. The opposite end, adjacent the opening 112 of greater diameter has rounded corners which allow it to freely hinge about its engaged locking pin 116. Since the opening 112 has a larger diameter than the outer diameter of the locking pin 116, the locking pin can move about the opening 112, thus allowing the connected segments 92 to separate a distance equal to the difference between the diameter of the opening 112 and that of the locking pin 116. The result is a hinged column support 90 that can move about a connecting cross link 108, specifically about the opening 112 of the cross link 108. The separating distance provides a column support 90 which can contact respective top and bottom faces to provide vertical support and stability and which can provide the column support 90 sufficient room to collapse about the cross link locking pin 116 along the adjacent rounded edges without binding. In effect, during collapse, the column supports 90 "roll" over the rolling surfaces and the rounded edges 106. Once the upper segments moves past the instability axis 93, relative to the lower segment 92, the column support 90 becomes unstable and will continue to collapse to the fully collapsed position, as shown in FIG. 5c, aided by the system fluid pressure.

The column supports 90 are positioned within the column chamber 100 of the main housing 12. The top surfaces of each column support 90 (the top face of each upper segment 92 of each pair) contact a lower face of the access plug 104. The access plug 104 is threaded within the access port 102, in the main housing 12 centered along the piston axis 32. The access plug 104 can be used to adjust the closed position of the piston 34 when the column supports 90 are locked in the straight position, as shown in FIG. 1. By removing the access plug 104, the resulting access port 102 provides easy and immediate access to the column supports 90 for possible replacement or repair.

Adjacent the front surface of one column support 90 is the support wall 96. The support wall 96 can be an insert, positioned through the access port 102 or an integral wall formed with the casting of the main housing 12. The purpose of the support wall 96 is to provide support to the column supports 90 while they are in the straight and supportive position. As further described below, a resetting member pushes the rear face of one column support 90 against the rear face of the other column support 90, which in turn, pushes its front surface against the support wall 96. A lower portion of the support wall 96 is used as a stop point to prevent the rising piston 34, during the opening operation, from extending to far into the column chamber 100, thus preventing possible damage to the collapsed column supports 90.

An opening 120 is provided through the supporting wall 96. The opening 120 is adapted to receive a plunger 140 of the triggering assembly 16, described below. The opening 120 lies perpendicular to the front surface of the adjacent column support 90, centered along a triggering axis 122 which preferably intersects the slots 114 and the locking pins 86 of the respective upper segments 92 of the column support pair 90.

The column supports 90 are first positioned into a straight position as shown in FIG. 1. The segments 92 are inline with the vertical piston axis 32 and the axis of piston load so that the segments provide a stable support and resist collapse when a vertical force is applied along the piston axis 32 by the piston 34 in the closed position. The support wall 96 further encourages the straight column supports 90 to remain straight by providing a surface the front surface of the column support pair can contact. Stability is further maintained by the resetting member pushing the column support pair against the support wall 96, as further described below.

The provisions of maintaining stability to the columns supports 90 described thus far are sufficient to overcome any undesirable influences of instability created by forces outside the valve 10. Such unstable forces include vibration and sudden movement and vary with the particular application of the valve. 10.

Controlled instability is provided by a force applied to the column supports 90 in a direction transverse to the piston axis 32 and perpendicular to the front surface 94 of the column supports 90. The transverse force is generated by the plunger 140 of the triggering assembly 16, which overcomes all provisions of stable support within the valve 10 and collapses the column support pair 90 to a non-supportive position, as shown in FIGS. 2 and 5c. The lack of support of the collapsed columns 90 allows system fluid pressure to force the piston 34 to the open position.

The dimensions and materials of the column support pair 90 and the cross link 108 depend on the design and application of the valve 10. In most instances, including the preferred embodiment, the columns support pair 90 and related interacting parts should be made from a material that can withstand the rigors of the intended environment including extreme vibration, movement and heat, and also withstand the sudden impact of moving parts during the opening of the valve 10. Furthermore, the column supports 90 must be strong enough to support the piston 34 against fluid pressures exceeding 1600 pounds per square inch. As described above, the segments 92 can be cut directly from a roller bearing whose diameter is generally equal to the segments length.

The triggering assembly 16 of the present valve is centrally positioned along the triggering axis 122 which is perpendicular to the piston axis 32. The triggering assembly 16 includes a cylindrical triggering assembly housing 124 which contains an electrical triggering assembly 126, and a manual triggering assembly 128 contained within a cylindrical manual triggering assembly housing 132. The manual triggering assembly housing 132 is secured to a remote end 130 of the triggering assembly housing 124 along the triggering axis 122 using bolts (not shown). A plunger end 134 of the triggering assembly housing 124 (opposite the remote end 130) is secured to a portion of the main housing 12 using circumferential screw threads 136, as described below.

The electrical triggering assembly 126 includes a solenoid assembly 138, a plunger 140, a load spring 142, and an armature 144. The solenoid assembly 138 includes a cylindrical cup-like outer housing 146, an inner core 148, a permanent magnet 150, an electric coil 152 and a contact face 154. The outer housing 146 includes a rear wall surface 156, a cylindrical wall 158, and a front rim 160. An inwardly directed flange 162 is provided along the inner wall surface of the cylindrical wall 158, adjacent the rim 160. The flange 162 helps retain the contents of the solenoid assembly 138 within the outer housing, as discussed below. Screw threads 164 are provided along the outer surface of the cylindrical wall 158, adjacent the rim 160. The screw threads 164 are adapted to engage mating screw threads 166 located within the main housing 12 and secure the solenoid assembly 138 to the main housing, centered along the triggering axis 122. The inner core 148 is located along the triggering axis 122 within the outer housing, as shown in FIG. 4a. The inner core 148 is preferably cylindrical and includes a rear contact surface 168, a front contact surface 170, and a spring recess 172 extending from the front contact surface 170 and being centered around the triggering axis 122 for housing the spring 142. The magnitude of the outer diameter of the cylindrical inner core 148 is preferably about half the magnitude of the inner diameter of the cylindrical outer housing 146. An opening 174 is provided through both the outer housing 146 and the inner core 148, centered along the triggering axis 122. The opening 174 extends the entire length of the solenoid assembly 138, its purpose to support the plunger 140. The opening 174 includes a bushing 178, preferably made of brass to create a smooth "frictionless" surface for the slidable plunger 140. The bushing 178 extends from the rear wall 127 of the outer housing 146 to the beginning of the spring recess 172, centered around the triggering axis 122. The magnet 150 lies within the outer housing 146, abutting against the inner surface of the rear wall 127 and the rear contact surface of the inner core 148. The outer housing 146 and the inner core 148 are made from any strong material that conducts magnetic flux, such as steel.

The electric coil 152 is positioned within the outer housing 146 and around the inner core 148 between the rear contact surface 168 of the inner core 148 and the inwardly directed flange 162 of the outer housing 146. Although adjacent, the coil 152 is isolated from both the outer housing 146 and the inner core 148 by an electrical insulator such as epoxy resin layer 182. The epoxy layer 182 also provides support to the inner core 148 and the magnet 150, preventing them from moving.

The plunger 140 is preferably a rod made from steel having a diameter whose magnitude is substantially similar to the opening 174 so that it can slide smoothly through the solenoid assembly 138. It includes a front portion 176 and a rear portion 180. The plunger 140 can be made from any strong, rigid material such as steel, the preferred material.

The armature 144 is a disc of magnetically conductive material such as steel having a central opening adapted to receive the plunger 140. The outer diameter of the armature disc has a magnitude which is approximately equal to the diameter of the outer housing 146 (measured across the rim 160). The armature 144 is adapted to contact the front contact surface 170 of the inner core 148 and the rim 160 of the outer housing 146. The armature 144 includes a spring holding recess 184 adapted to receive a front end of the load spring 142 to ensure that the spring 142 will remain straight and not interfere with the contact of the armature 144 and the contact surface 170 of the inner core 148, as described below. The armature 144 is attached to the plunger 140 at a point 186, described below, using conventional C-type clips 188 which engage into circumferential grooves (not shown) provided adjacent the point 146. The armature 144 can also be incorporated with the plunger 140 during manufacture, thereby forming a one-piece plunger/armature assembly.

The length of the plunger 140 should be sufficient to allow its rear portion 180 to protrude from the rear wall surface 156 of the outer housing of the solenoid assembly 138, when the armature is abutting the front contact surface 170 of the inner core 148. The purpose of the protruding rear portion 180 is to provide for manual disengagement, as described below. The distance of the plunger 140 measured between the armature 144 and the front portion 176 should be sufficient so that when the armature 144 is engaged with the front contact surface 170, the plunger 140 will not interfere with the supporting columns 90 and when the armature 144 is disengaged (electrically or mechanically) as further described below, the plunger 116 can interfere with the support columns 90 and activate the valve, as further described below.

In operation, the solenoid assembly 126 is first "latched" into a loaded and ready position by moving the plunger 140 rearwardly, away from the piston axis 32, until the armature 144 on the plunger 140 engages with the contact surface 170 of the inner core 148. The inner core 148 is magnetic, transmitting the magnetic flux generated by the adjacent magnet 150 to the front contact surface 170. The magnetic flux residing at the front contact surface 170 is sufficient to "hold" the armature 144 against the action of the load spring 142. The armature 144 and the attached plunger 140 are in the loaded and ready position. The expansion force exerted on the armature 144 by the compressed spring 142 is restrained by the greater force provided by the magnetic flux at the front contact surface 170 of the inner core 148.

Upon electrical disengagement, the coil 152 is electrically energized with a D.C. electric source located remote to the valve by way of conductive wires (not shown). The source of power provides an instant surge of direct current. The current flows through the coil in one direction and generates an induced magnetic field. The winding direction of the coil 152 and the predetermined and consistent supplied current is such that the resulting induced magnetic field will be opposite to that generated by the permanent magnet 150. The magnitude of the induced magnetic field generated by the coil 152 instantly (within milliseconds) becomes equal to the magnitude of the permanent magnet. For an instant of time (depending on the controlling circuitry), the opposing magnetic fluxes cancel one another. The expansion force provided by the spring 142 becomes dominant in the solenoid assembly and pushes the adjacent armature 144 away from the contact surface 170 of the now neutral inner core 148, thus forcing the plunger 140 forward, towards the piston axis 32 and as explained below, into the locking component 14 of the valve assembly 10. It is possible that the induced magnetic field generated by the energized coil 152 could become greater than the magnetic field produced by the permanent magnet 150, in which case the inner core 148 could become magnetic shortly after the two magnetic fluxes become neutral. In such instance, the front contact surface 170 of the inner core 148 would become magnetic with a magnetic polarity opposite to that transmitted by the permanent magnet. The steel armature 116 is attracted to a magnetic flux having either polarity and could "snap" back into engagement with the front contact surface 170 shortly after disengagement. To overcome this potential malfunction, the preferred spring 142 of the solenoid assembly 126 is of sufficient strength to force the armature 144 away from the front contact surface 170 a distance, upon disengagement, which is great enough to overcome any recurring attraction between the armature 144 and the front contact surface 170. The maximum induced magnetic field generated by the coil 152 can be controlled by limiting the number of windings contained by the coil 152 and/or by providing a current limiter, such as an electric choke, thereby limiting the maximum amount of current entering the coil 152.

The manual triggering assembly housing 132 includes a release member 190, a pivot pin 192, a stop pin 194, a safety pin 196 and a spring 198. The release member 190 includes an opening to snugly receive the pivot pin 192. Another opening 200 is provided through the release member 190 for receiving the safety pin 196. The pivot pin 192 is supported by the manual triggering assembly housing 132 by securing the ends of the pivot pin 192 into openings (not shown) provided in the housing 132. The release member 190 can move about the pivot pin 192 from a resting position to a triggering position. In the preferred embodiment, the triggering position is closer to the piston axis 32 of the valve than the resting position. The stop pin 194 is also secured into the housing 132 and is adapted to contact a portion of the release member 190, thus establishing the resting position of the release member 190. The release member 190 also includes a spring recess 202 adapted to receive one end of the spring 198. The other end of the spring 198 is received and held by another spring recess 206 formed into a wall portion of the triggering assembly housing 124, as shown in FIG. 1. The spring 198 is compressed when the release member 190 is in the rest position. The compressed spring 198 biases the release member 190 against the stop pin 194. An additional opening 204 is provided through the manual triggering assembly housing 132. The opening 204 is positioned such that when the release member 190 is in its rest position, the openings 159 and 161 will align and permit entry of the safety pin 196. Once the safety pin 196 enters the openings 159 and 161, it locks the release member 190 relative to the manual triggering assembly housing 132 into the rest position and prevents the release member 190 from moving to the triggering position and triggering the valve 10.

The release member 190 is positioned so that it crosses the triggering axis 122. An plunger opening 208 and an adjacent recess cavity 210 is provided at the intersection of the release member 190 and the triggering axis 122.

The rear end 143 of the plunger 140 enters the manual triggering assembly housing 132 from the triggering assembly 100 through an opening 212. A seal 216 is provided within the opening 212 so prevent contamination of the inner compartments of the valve 10. The seal 216 contacts the surface of the plunger 140, but does not hinder its sliding movement through the opening 212.

The rear end 143 of the plunger 140 includes a threaded portion 214 of reduced diameter (relative to the plunger diameter). The threaded portion 214, having a smaller diameter, defines a step 218 adjacent the point of increased diameter along the plunger 140. The threaded portion 214 is positioned within the plunger opening 208 and the recess cavity 210. The step 218 of the plunger 140 has a greater diameter than that of the plunger opening 208. The threaded portion 214 is adapted to receive an adjustment nut 220 which remains within the plunger recess cavity 210. The diameter of the nut 220 is greater than that of the plunger opening 208.

The release arm 150 should be positioned so that when it is in the rest position, biased up against the stop pin 194 by the compressed spring 198, the release arm 150 contacts the step 218 of the plunger 140. The nut 220 should be threaded to a predetermined distance that allows the solenoid plunger 140 to travel its entire throw before the surface of the nut 220 contacts the release member 190.

The manual triggering assembly 128 provides the user of the valve an alternative method of triggering it to the open position, should the electrical triggering system be inaccessible or malfunctioning. To operate, the user removes the safety pin 196 from the openings 159, 161, thereby "unlocking" the release arm 150. The release member 190 is then moved towards the piston axis 32 against the action of the compressed spring 198 and about the pivot point 152. As the release member 190 moves from the resting position to the triggering position it produces a biasing force which urges the plunger 140 towards the piston axis 32 through direct contact with the step 218. The force exerted on the plunger 140 by the moving release member 190 together with the force developed by the spring 142 eventually overcomes the magnetic force retaining the armature 144 against the contact surface of the inner core 148. At this point, the armature 144 and the plunger 140 move towards the piston axis 32 from the forces of both the spring 142 and the moving release arm 150. The moving plunger 140 triggers the valve 10 to the open position.

Upon release of the release arm 150, the spring 198 returns the release arm 150 back to the resting position, the movement being halted by the stop pin 192. The nut 220 contacts the returning release arm 150 at a predetermined point along its return travel and pulls back the plunger 140 away from the piston axis 32. The nut is preferably positioned along the threaded portion 170 of the plunger 140 so that the released armature 144 can be moved close enough to the contact surface of the inner core 148 that the pulling force applied by the magnetic contact surface 170 is sufficient to complete the return of the armature 144 and the attached plunger 140 to the "reset" and engaged position, against the action of the load spring 142.

With this arrangement of the above-described triggering assembly 100, the valve 10 can be triggered to an open position by either closing an electrical circuit (not shown) thereby energizing the coil of the solenoid 102 or moving a manual release arm. Regardless of which method is used to trigger the valve open, once triggered, the plunger 140 is "reset" by movement of the release member 190, as described above.

The resetting assembly 22 of the valve 10 of the present invention is an important one. It allows the operator of the valve to quickly and easily reset collapsed column supports 70 back to a straight and supportive position. Since the valve operates by system fluid pressure, the resetting procedure is only done when the system pressure is low enough to move the piston 34 back to a closed position. In the case of the fire extinguishing application, the valve would remain open during the release of the extinguishant and could not be reset to the closed position until the extinguishant is expelled. In such instance, a remote valve could be provided in the system to prevent entire depletion of an extinguishant supply. The remote valve could be shut off and the present valve then reset.

The resetting assembly includes a reset housing 222, a reset plunger 224, a main load spring 226 and a release assembly 228 for disengaging the plunger from the load spring, as further described below.

The reset plunger 224 includes a resetting contact block 230 located at one end. The contact block 230 includes a front face 232 and two parallel side portions 234. Formed within the front face 232 of the contact block 230 is a "V" shaped recession 236, as viewed from the side, as shown in FIG. 6b. The recession 236 is substantially similar to the shape formed by the collapsed column support pair 70 having two angled faces 236a and 236b, intersecting along an axis 238. The axis 238 extends perpendicular between the two parallel side portions 234. The recession 236 is adapted to "catch" the collapsing column supports 70 as the valve 10 "opens". The contact block 230 is located within the column chamber 100 of the main housing 12. The side portions 234 are adapted to slide adjacent to the walls of the column chamber 100 with a tolerance that provides unrestricted linear movement along the triggering axis 122, but prevents rotational displacement about the triggering axis 122. With this arrangement, the sliding engagement of the side portions 234 of the contact block 230 and the walls of the column chamber 100 maintain one orientation of the "V" shaped recession 236 with respect to the column support pair 70. The preferred orientation of the "V" shaped recession 236 is such that the axis 238 always lies parallel to the hinging axis of the column supports 70 (perpendicular to both the piston axis 32 and the triggering axis 122). The front face 232 including the "V" shaped recession 236 abuts the rear surface 98 of an adjacent column support 90. The contact block 230 is shaped so that an upper portion of the flat front face 232 abuts a portion of an upper segment 92 of the column support 90 and a lower portion of the front face 232 abuts a lower segment 92 of the same column support 90. These points of contact between the upper and lower portions of the front face 232 and the respective upper and lower segments 92 force the adjacent column support 90 against the other column support 90, which is forced against the flat supporting surface provided by the support wall 96. The reset plunger 224 is biased towards this position of supporting the column support pair 70 in the vertical and supportive position, as shown in FIG. 1.

The reset plunger 224 is slidably located within a bore 240 which is formed within the reset housing 222, centered along the triggering axis 122.

The purpose of the release assembly 228 of the resetting assembly 20 is to provide a means to bias the reset plunger 224 towards the piston axis 32, thereby supporting the column support pair 70 in the straight and supportive position, and also not limit, or interfere with the movement of the reset plunger 224 during valve opening. The release assembly immediately disconnects the load force of the load spring 226 from the moving reset plunger 224 during the opening procedure of the valve 10. If the load spring 226 otherwise remained connected to the reset plunger 224, the velocity achieved by the reset plunger 224 during the valve's opening would be sufficient to destroy the load spring 226.

The present valve 10 is intended to open within a period of milliseconds. If the reset plunger 224, which must slide out off the way of the collapsing column supports 70, encounters resistance from the load spring 226, the sliding movement of the reset plunger 224 will be hindered and the valve 10 will not open as quickly as desired.

The release assembly 228 includes a cylindrical, cuplike counterweight 242, the load spring 226, engagement pegs 244, interlocking groove 246 circumferentially disposed around the shaft of the reset plunger 224 and a selectively molded end cap 248.

Figure 7:
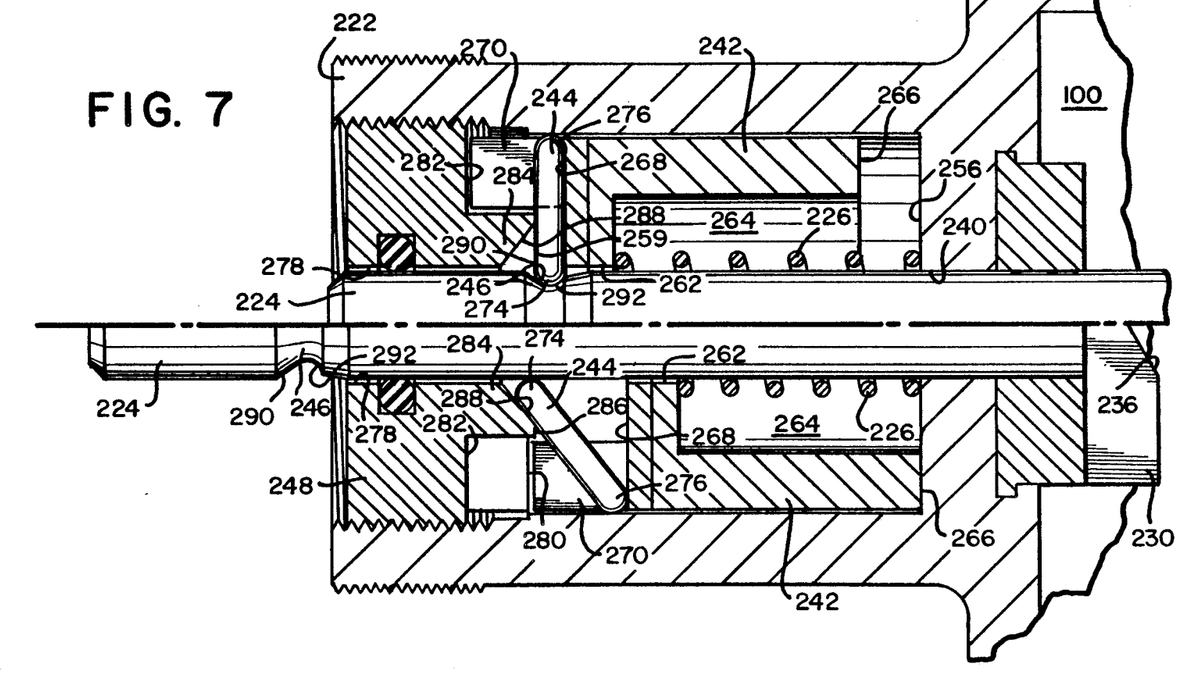
FIG. 7 is a split sectional view of the resetting assembly, the upper half shows an engaged resetting assembly, the lower half shows a released resetting assembly.

The reset housing 222 is preferably made from a strong material such a aluminum or steel and is either formed as an integral section during the casting of the main housing 12, as shown in FIG. 7, or is attached to the main housing 12 as a separate component. In either case, the reset housing 222 includes a cylindrical bore 250, centrally located along triggering axis 122. The bore 250, which acts as a cylinder for the enclosed counterweight 242 defines a rim portion 252, an inner wall surface 254 and a bottom wall surface 256. Along the inner wall surface 254, adjacent the rim portion 252 are screw threads 258 for engaging screw threads 260 located along a circumferential edge surface of the molded end cap 248.

As shown in FIG. 7, the counterweight 242 is slidably positioned within the bore 230 between a rest position and a loaded position. FIG. 7 shows part of the counterweight 242 in the rest position (the upper half of the Figure) and part in the loaded position (the lower half of the Figure). The counter-weight 242 is in the loaded position when the valve 10 is in the open position, as shown in FIG. 2, and is in the rest position when the column support pair 70 is in the upright and supportive position. The counterweight 242 is preferably made from steel and includes an opening 262, centrally located along the triggering axis 122. The opening 262 is adapted to receive the reset plunger 224. The counterweight 242 includes a spring bore 264, sufficiently large to contain the load spring 226. The spring bore 264 of the cylindrical counterweight 242 defines a rim surface 266 which faces inwardly towards the main housing 12 and the piston axis 32. The counterweight 242 is such that when it is in the loaded position, as shown in the lower portion of FIG. 7, the rim surface 266 of the counterweight 242 contacts the bottom wall surface 256 of the bore 230 and creates a dead stop loaded position.

The counterweight 242 in effect provides a means to counter balance the high loading on the column supports 90 and the reset plunger that might be imparted to these parts in a direction to cause valve opening, as a result of undesirable external forces (vibration, ballistic shock). The mass of the counterweight 242 is preferably equal to the mass of the reset plunger 224 and the effective mass of the column supports 90 rolling out from stability.

The counterweight 242 includes a circular surface 268 which lies remote to the piston axis 32, opposite the rim surface 266. Evenly spaced along the periphery of the circular surface 268 are four guide blocks 270, protruding a prescribed protruding length in a direction opposite to that of the piston axis 32 and the main housing 12. Each protruding guide block 270 includes a guide slot 246 which extends through the protruding guide block 270 a prescribed depth and is directed radially outward from the central opening 262 to the periphery of the circular surface 268 of the counterweight 242. The prescribed protruding length and the prescribed slot depth are preferably equal so that the guide slots 246 extend through each protruding guide block 270 to the circular surface 268. The guide slots 246 are of sufficient width to receive and guide the four engagement pegs 244.

The engagement pegs 244 are cylindrical with rounded, hemispherical ends, a plunger end 272 and a wall surface end 276. The engagement pegs 244 a positioned within their respective guide slots 246 and are movable therein between an engaged position, as shown in FIG. 7 (lower), to a released position, as shown in FIG. 7 (upper).

The molded end cap 248 includes a central opening 278 along the triggering axis 122, which is adapted to receive the plunger 224. The end cap 248 also includes a front surface 280 (directed towards the piston axis 32). The end cap 248 is secured within the reset housing 218 through the meshing of threads, as described above.

On the front surface 280 of the end cap 248 are guide block cavities 282 positioned along the periphery of the front surface 280, adjacent to the slidable guide blocks 270. The guide block cavities 282 are adapted to receive the protruding guide blocks 270 when the counterweight 242 is in the rest position. A protruding flange 284 is concentrically located on the front surface 280, directed towards the main housing 12 and the piston axis 32. The inner diameter of the concentric flange 284 equals the diameter of the central opening 278. The magnitude of the outer diameter of the concentric flange 284 is approximately equal to the radial inner distance between two opposing guide blocks 270. The protruding flange 284 having a front contact surface 286 is centered along the triggering axis 122, adjacent the central opening 278. A sloping edge surface 288 is located on the flange 284. The slope of the sloping edge surface 288 begins at the front contact surface 286 of the flange 284 and extends both inwardly (towards the triggering axis 122) and the rim portion 252 of the reset housing 222. The end result is a conical surface truncated by the central opening 278.

The sloping surface 288 does not "consume" the entire front contact surface 286, as shown in FIG. 7. The angle of the sloping surface 288 is predetermined and depends on several design factors including the diameter of the bore 230, the length of the engaging pegs 244, the throw of the reset plunger 224 from the supporting position (shown in FIG. 1) to the released position (shown in FIG. 2).

The engagement pegs 244 has two stable positions, an engaged position as shown in the upper half of FIG. 7 and a released position shown in FIG. 7 (lower). In the engaged position, the engagement peg 244 rests within the guide slot 246, abutting the circular surface 268 of the counterweight 242. When the engagement pegs 244 are in the engaged position, the counterweight 242 is in its rest position, with the load spring least compressed position, and the guide blocks 270 are nested within their respective guide block cavities 282. With this arrangement, the engagement pegs 244 contact the contact surface portion 259. The compressed load spring 226 pushes the counterweight 242 against each adjacent engagement peg 244. The engagement pegs are met with resistance, the contact surface portion 259 of the flange 284. The contact surface portion 259, which contacts each peg 244 approximately midpoint along its length, forces each peg 244 against the circular surface 268 of the counterweight 242. This arrangement is shown in the upper portion of FIG. 7.

The distance between the innermost point of the groove 246 and the inner surface wall 230 preferably equals the length of each engagement peg 244.

The circumferential groove 246 is located around the reset plunger 224. The width of the groove 246 is preferably equal to the diameter of the engagement peg 244. As shown in FIG. 7, in cross-section, the groove 246 preferably includes two functional sections, a sharply curved locking section 292 and a more gradually sloping face section 290. The locking section 292 of the groove 246 is positioned closer to the main housing 12 and the piston axis 32 and is shaped similar to that of the circular (the cross-section view of a hemisphere) end of the engagement peg 244. The gradual sloping face section 290 of the groove 246 creates a less sharp shape than that of the circular end of the engagement peg 244 and is useful for engaging the rounded end of the engagement peg 244 into the groove 246 during the resetting procedure, as further described below.

In operation of the resetting assembly, the reset plunger 224 is positioned within the reset housing 222 so that the contact block 230 holds the column supports 90 against the support wall 96. In this position, the groove 246 is positioned between the circular surface 268 and the front contact surface 286 so that one end of the engagement peg 244 engages with the locking section 292 of the groove 246. The load spring 226 pushes against the counterweight 242 and the engagement pegs 244. The front contact surface 286 keeps each peg 244 against the circular surface 268 of the counterweight 242. As the reset plunger 224 moves away from the piston axis 32 (during valve opening, for example), the groove 246 also moves away from the piston axis 32. The locking section 292 of the moving groove 246 "carries" the plunger end 274 of the engagement pegs 244 away from the piston axis 32. As the plunger ends of the engagement pegs 244 move towards the sloping edge surface 288 of the end cap 248, the pegs 244 pivot about the front contact surface 286. This pivoting action of each peg 244 forces the opposite end (the wall surface end 276) towards the piston axis 32. The wall surface ends 276 of the pegs 244 move against the surface 268 of the counterweight 242, pushing the counterweight towards the piston axis 32 against the action of the load spring 226. When the groove 246 moves past the sloping edge surface 288 and into the opening 278 of the end cap 248, the engagement pegs 244 will be forced against the sloping edge surface 288 and the plunger end 274 will no longer have a locking connection with the locking section 292 of the groove 246 and will exit the groove 246. Once the plunger ends of the engagement pegs 244 have been "pried" from the groove 246, the reset plunger 224 can move further away from the piston axis 32 while the valve 10 continues to open. Owing to the length of the engagement pegs 244, the pegs 244 will be unable to lie flush with the surface 268 of the counterweight 242 until the return of the groove 246. In the meantime, while the valve 10 is in the open position, the engagement pegs 244 will remain up against the sloping edge surface 288 with the plunger ends 274 in contact with the surface of the reset plunger 224 by the opposing force of the counterweight 242 and the load spring 226. While the valve 10 is open, the engagement pegs 244 push the counterweight 242 towards the piston axis so that the rim surface 266 contacts the bottom wall surface 256. The reset plunger 224 continues to move away from the piston axis 32 until the contact block 230 contacts a wall portion of the main housing 12 within the column chamber 100. The end of the reset plunger 224 opposite the contact block 230 protrudes from the end cap 248, outside the reset housing 222.

With the valve open, the column supports 90 are collapsed, positioned within the recession 236 of the contact block 230. To reset the column supports 90 back to the upright and supportive position, the reset plunger 224 is pushed back towards the piston axis 32. The accessible protruding remote end of the reset plunger 224 is pushed inwardly, manually or electrically by a solenoid (not shown). As the reset plunger moves towards the piston axis 32, the contact block 230 begins to straighten the collapsed column supports 90 up against the support wall 96. The groove 246 will move through the opening 278 of the end cap 248 to a position adjacent the plunger ends 274 of the retained engagement pegs 244. When enough of the groove 246 becomes exposed to the pegs 244, the load spring 226 moving the counterweight 242 pushes the plunger end 274 of the pegs 244 into the groove 246. The sloping face section 290 "catches" the plunger end 274 of the pegs 244 and hold them while the reset plunger 224 continues to move towards the piston axis 32. The reset plunger 224 pivots the pegs 244 about the front contact surface 286, thereby lifting the wall surface end 276 of the pegs 244 away from the piston axis 32 and the surface 268 of the counterweight 242. The load spring 226 continues to force the counterweight 242 into tight engagement with the pegs 244. The force of the load spring 226 encourages inward movement of the reset plunger 224 by forcing the pegs 244 to pivot about the front contact surface 286. When the pegs 244 again lie flush against the surface 268, perpendicular to the inner wall surface 254 and engaged in the locking section of the groove 246, the reset plunger 224 will be in the reset position and the contact block 230 will have straightened the column supports 90 and will be in contact with them.

Depending on the amount of force used to reset the reset plunger 224, the solenoid assembly 138 can be reset using the manual release member 190, as described above, or be reset automatically with the movement of the straightening column supports 90 pushing the adjacent plunger 140 and the armature 144 into the locked and reset position.

Once the engagement pegs 224 are engaged into the locking section 292 of the groove 246, the valve 10 is protected against unintended outside triggering forces (vibration, movement, etc.). The force of the counterweight 242 against the pegs 244 by the load spring 226 restrain outward movement of the reset plunger 224. The transverse triggering force created by the load spring 142 of the solenoid assembly 138 is preferably greater than the restraining force. The triggering force can therefore overcome the restraining force of the engaged pegs 244 and release the reset plunger 224 from the locked position. The magnitude of restraint generated by the engaged pegs 244 depends on the force of the load spring 226 and the location of the front contact surface 286 relative to the midpoint of each engagement peg 244.

In operation of the entire valve assembly 10, the piston 34 is in the closed position, the column supports 90 are straight and keep the piston in the closed position against the pressure of the fluid of the connected fluid system. The contact block 230 biased towards the column supports 90 by the engagement of the pegs 244 and the groove 246. The solenoid assembly 138 is locked in the engaged and ready-to-trigger position. The fluid pressure enforces the seal between the piston 34 and the inlet port wall surface.

In the closed position, the valve 10 is restrained from accidental triggering as described above. When desired, the valve 10 is triggered, either electrically through the use of the solenoid assembly 138 or manually through the use of the release member 190. The lateral movement of the plunger 140 trips the stable column supports 90. Once the abutting faces of the two column supports 90 roll to the rounded portion the columns become unstable and valve opening is imminent. The pressure of the fluid forces the piston 34 to the open position forcing the columns supports 90 to collapse fully into the "V" shaped recession 236 of the contact block 230. The collapsing column supports 90 forces the reset plunger 224 to release from the hold of the engagement pegs 244. The valve remains open until it is reset.

As described above, inward movement of the reset plunger 224 causes the column supports 90 to straighten and push the piston back to the closed position. The solenoid assembly 138 is reset by drawing the plunger 140 and armature 144 in to magnetic engagement with the inner core 148 using the release member 190.

What is claimed is:

1. A valve for use in a fluid system for controlling the release of a pressurized fluid, said valve comprising:
   a housing having a fluid chamber;
   an inlet port and an outlet port in fluid communication with said fluid chamber, said inlet port including a sealing surface;
   a piston slidably positioned within said housing, said piston including a valve surface and being movable along an axis between a closed position where said valve surface lies within said inlet port and an open position where said valve surface lies remote to said inlet port;
   means for sealing said piston within said inlet port with a radially directed sealing force when said piston is in said closed position, said sealing means engaging said sealing surface of said inlet port, said sealing force being generated by the force exerted on said valve surface of said piston by said pressurized fluid, said sealing force being sufficient to prevent fluid communication of the pressurized fluid with said fluid chamber when said piston is in the closed position;
   means for providing selective support for controlling the position of said piston relative to said inlet port, said support means being changeable between a rigid condition and a collapsed condition, pistion movement between said closed and open positions being responsive to said condition of said support means, wherein said support means in said rigid condition retains said piston in said closed position against the action of the opposing force of said pressurized fluid exerted on said valve surface and said support means in said collapsed condition being unable to retain said piston in said closed position against said pressurized fluid, and in said collapsed condition, said pressure of said fluid causing said piston to move from said closed position to said open position, thus providing fluid communication between said inlet and said fluid chamber; and
   means for controlling the condition of said support means,
   said selective support means includes at least two rigid, elongated supports centered longitudinally along an axis, said supports connected together with a linkage.

2. The valve according to claim 1 wherein said linkage is such that said supports are movable from a supportive position where said supports and said linkage are located along said axis, thereby defining said rigid condition, to a non-supportive position where said supports and said linkage are misaligned with said axis and said linkage is located a predetermined distance from said axis so as to define said collapsed condition.

3. The valve according to claim 2 further comprising means for selectively resetting said supports from said non-supportive position to said supportive position.

4. The valve according to claim 2 further comprising means for selectively retaining said supports in said supportive position such that movement of said valve will not accidently move said supports to said non-supportive position, said support selective retaining means being overcome by said controlling means.

5. The valve according to claim 4 wherein said support selective retaining means includes a support plunger having a head portion which contacts said supports, said support plunger being movable along said axis and held towards said supports by support plunger biasing means.

6. The valve according to claim 5 wherein said support plunger biasing means includes:

a cylinder centered around said axis and through which said support plunger moves;

a weighted piston slidably positioned within said cylinder, said piston having a central opening through which said shaft of said support plunger moves; and means for selectively attaching said weighted piston to said shaft of said plunger, said selective attachment means being operational when said armature is located in said rest position during which said weighted piston provides inertial support of said supports by preventing movement of said plunger shaft and said plunger relative to said supports in said supportive position, said selective attachment means being inoperational, causing said weighted plunger to detach from said plunger shaft when said armature moves to said tripping position, thereby allowing said plunger shaft and said plunger to move quickly away from said supports which are collapsing to said non-supportive position.

7. The valve according to claim 2 wherein said linkage allows a contact surface of each of said supports to contact each other at least when said supports are in said supportive position, said contact surface being shaped such that, during said supportive position, said supports remain stable along said axis and will encourage quick movement to said non-supportive position when said linkage is moved out of alignment with said axis by said controlling means.

8. The valve according to claim 7 wherein said controlling means includes a selectively generated force applied transversely to said axis.

9. The valve according to claim 8 wherein said selectively generated force is provided by a movable plunger of a solenoid positioned adjacent to said housing, said plunger being movable under the influence of a selectively generated magnetic field of said solenoid from a rest position where said plunger is located away from said axis to a tripping position where a portion of said plunger intersects said axis and contacts a portion of said supports located in said supportive position.

10. The valve according to claim 9 wherein said selectively generated force includes a lever which is pivotally connected to said housing and movable between a locked position where said lever is not in contact with said plunger to an open position where a portion of said lever contacts a portion of said plunger and moves said plunger from said rest position to said tripping position.

11. The valve according to claim 9 wherein said plunger includes an armature.

12. The valve according to claim 11 wherein said solenoid includes means for retaining said armature in said rest position such that movement of said valve will not cause said armature to accidently move to said tripping position and prematurely open said valve.

13. The valve according to claim 12 wherein said retaining means includes a permanent magnet generating a magnetic field and wherein said armature is made from a magnetic material, said permanent magnet being positioned such that said armature is magnetically attracted to said permanent magnet and said plunger is retained at said rest position.

14. The valve according to claim 13 wherein said generated magnetic field flow of said solenoid is both equal in magnitude to said magnitude of said magnetic field flow generated by said permanent magnet and opposite in flow direction to said direction of said field flow of said permanent magnet such that said generated magnetic field of said solenoid effectively neutralizes said magnetic field of said permanent magnet, thereby releasing said armature from permanent magnet.

15. The valve according to claim 14 further comprising a spring for providing said plunger with a force to move from said rest position to said tripping position, said spring having an applicable force which is not greater in magnitude than said magnitude of said magnetic field of said permanent magnet.

16. The valve according to claim 15 further comprising means for selectively resetting both said supports from said non-supportive position to said supportive position and said plunger from said tripping position to said rest position.

17. A valve for use in a fluid system for controlling the release of a pressurized fluid, said valve comprising:
a housing having a fluid chamber;
an inlet port and an outlet port in fluid communication with said fluid chamber;
a piston slidably positioned within said housing, and being movable along an axis between a closed position and an open position;
means for sealing said piston within said inlet port when said piston is in said closed position, said sealing means being sufficient to prevent fluid communication of the pressurized fluid with said fluid chamber when said piston is in the closed position;
means for providing selective support for controlling the position of said piston relative to said inlet port, said support means being changeable between a rigid condition and a collapsed condition, piston movement between said closed and open positions being responsive to said condition of said support means and the pressure of said fluid when fluid pressure is applied, said support means in said rigid condition retains said piston in said closed position and said support means in said collapsed condition being unable to retain said piston is said closed position against applied pressurized fluid, and in said collapsed condition, said pressure of said fluid, when applied, causing said piston to move from said closed position to said open position and providing fluid communication between said inlet and said fluid chamber, said selective support means includes at least two rigid, elongated supports centered end to end along a longitudinal axis, said supports each having a first end and a second end, said first ends being in contact with each other in said closed piston position.

18. A valve as in claim 17, wherein said first support ends are in rolling contact.

19. A valve as in claim 17, wherein said first support ends are in rolling contact on first arcuate surfaces, and further comprising a pair of parallel surfaces in said housing, said supports being positioned between said parallel surfaces and perpendicular thereto in said closed piston position with the second end of one support being in rolling contact on a second arcuate surface with one said parallel surface and the second end of the other support being in rolling contact on a second arcuate surface with the other parallel surface.

20. A valve as in claim 19, wherein said first and second arcuate surfaces on each said support are portions of a common circle.

* * * * *